US010015844B2

(12) United States Patent
Bullock et al.

(10) Patent No.: US 10,015,844 B2
(45) Date of Patent: Jul. 3, 2018

(54) CONDENSATION INHIBITING DEVICE INCLUDING THERMOELECTRIC GENERATOR, AND METHOD OF INHIBITING CONDENSATION

(71) Applicant: LOCKHEED MARTIN CORPORATION, Bethesda, MD (US)

(72) Inventors: Steven E. Bullock, Canton, GA (US); Sarah M. Simon, Baltimore, MD (US); John B. Stetson, Jr., New Hope, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 255 days.

(21) Appl. No.: 14/788,449

(22) Filed: Jun. 30, 2015

(65) Prior Publication Data

US 2017/0001599 A1 Jan. 5, 2017

(51) Int. Cl.
*B60L 1/02* (2006.01)
*H05B 3/84* (2006.01)
*H05B 1/02* (2006.01)

(52) U.S. Cl.
CPC ............. *H05B 3/84* (2013.01); *H05B 1/0252* (2013.01); *H05B 2203/011* (2013.01); *H05B 2203/013* (2013.01); *H05B 2214/02* (2013.01)

(58) Field of Classification Search
CPC . H05B 3/84; H05B 3/845; H05B 3/86; H05B 3/0042; H05B 3/0071; H05B 1/0252; H05B 2203/011; H05B 2203/013; H05B 2214/02
See application file for complete search history.

(56) References Cited

U.S. PATENT DOCUMENTS

2008/0173344 A1* 7/2008 Zhang ..................... H01L 35/16 136/238
2010/0199686 A1 8/2010 Taras et al.
2011/0155713 A1 6/2011 Wang et al.
2012/0170120 A1 7/2012 Lee et al.

FOREIGN PATENT DOCUMENTS

WO WO 2015/095800 A1 6/2015

OTHER PUBLICATIONS

International Search Report dated Oct. 6, 2015.
R. Trujillo, et al., "Investigation of Electrostrictive Polymers as Actuators for Mesoscale Devices", Dec. 18, 2003, London Limited 2003, pp. 176-182.
Xuejun Xie, et al., "An Asymmetrically Surface-Modified Graphene Film Electrochemical Actuator", vol. 4, No. 10, 2010 American Chemical Society, pp. 6050-6054.
Sanjay S. Latthe, et al., "Ultrahydrophobic Silica Films by Sol-Gel Process" Sep. 16, 2009, Springer Science and Business Media, LLC 2009, pp. 565-571.

(Continued)

*Primary Examiner* — Shawntina Fuqua
(74) *Attorney, Agent, or Firm* — Hamre, Schumann, Mueller & Larson, P.C.

(57) ABSTRACT

A condensation inhibiting device includes a condensation inhibiting unit for inhibiting condensation on a first surface, and a thermoelectric generator which powers the condensation inhibiting unit.

20 Claims, 13 Drawing Sheets

(56) References Cited

OTHER PUBLICATIONS

Robert J. Daniello, et al., "Drag Reduction in Turbulent Flows Over Superhydrophobic Surfaces" , 2009 American Institute of Physics, pp. 1-9.
Xuesong Li, et al., "Transfer of Large-Area Graphene Films for High-Performance Transparent Conductive Electrodes" vol. 9, No. 12, 2009, American Chemical Society, pp. 4359-4363.
Clinton McKinnon, et al., "Commercial Bismuth Telluride-based Peltier Plates for Use as heat Flux Transducers" May 2010, pp. 32-36.

* cited by examiner

CONDENSATION INHIBITING DEVICE INCLUDING THERMOELECTRIC GENERATOR, AND METHOD OF INHIBITING CONDENSATION

BACKGROUND OF THE INVENTION

Field of the Invention

The present invention relates generally to a condensation inhibiting device and, more particularly, to a condensation inhibiting device which includes a thermoelectric generator.

Description of the Related Art

Many conventional devices include objects (e.g., mirrors, transparent members such as windows and doors, etc.) having a surface which is desirably free of condensation (e.g., water) and frost. Such conventional devices include, for example, aircraft, automobiles, watercraft, submarines, industrial equipment, farm equipment (e.g., combines), refrigerators (e.g., commercial refrigerators), freezers (e.g., commercial freezers) and building structures (e.g., homes and office buildings) and extending to small products including but not limited to eyeglasses and protective goggles.

FIG. 1 illustrates a conventional device 100 which includes an object 110 (e.g., mirror, window, door) having a surface which should desirably remain free of condensation and frost. A problem may develop when moisture in the air condenses on the transparent member 100 (e.g., fogging or frosting) resulting in a decrease in the performance (e.g., transparency, reflectivity, etc.) of the object 110.

Several conventional methods are used to inhibit condensation on transparent members. For example, the rear window of an automobile may include a wire heating grid which heats the window to inhibit condensation. The windshield of the automobile may include a defroster which blows warm air onto the inner surface of the windshield which warms the windshield to inhibit condensation on the windshield.

Another conventional method is to apply a hydrophobic coating to the surface of the transparent member. Such hydrophobic coatings may include, for example, manganese oxide polystyrene ($MnO_2$/PS) nano-composite, zinc oxide polystyrene (ZnO/PS) nano-composite, silicone polymer, carbon nanotube structures, and silica nano-coating.

SUMMARY

In view of the foregoing and other problems, disadvantages, and drawbacks of the aforementioned conventional devices and methods, an exemplary aspect of the present invention is directed to a condensation inhibiting device and, more particularly, to a condensation inhibiting device which includes a thermoelectric generator.

An exemplary aspect of the present invention is directed to a condensation inhibiting device which includes a condensation inhibiting unit for inhibiting condensation on a first surface, and a thermoelectric generator which powers the condensation inhibiting unit. It is also possible to employ external conventional power sources, if available, to drive the condensation inhibiting unit.

Another exemplary aspect of the present invention is directed to a device, including a first surface and a condensation inhibiting device. The condensation inhibiting device includes a condensation inhibiting unit for inhibiting condensation on the first surface, and a thermoelectric generator which powers the condensation inhibiting unit.

Another exemplary aspect of the present invention is directed to a method of inhibiting condensation which includes inhibiting condensation on a first surface using a condensation inhibiting unit, and powering the condensation inhibiting unit using a thermoelectric generator.

With its unique and novel features, the present invention may provide a condensation inhibiting device which can consume less energy compared to known condensation inhibiting devices.

BRIEF DESCRIPTION OF THE DRAWINGS

The foregoing and other objects, aspects and advantages will be better understood from the following detailed description of the embodiments of the invention with reference to the drawings, in which.

DETAILED DESCRIPTION OF SOME EXEMPLARY EMBODIMENTS OF THE INVENTION

Figure 1:
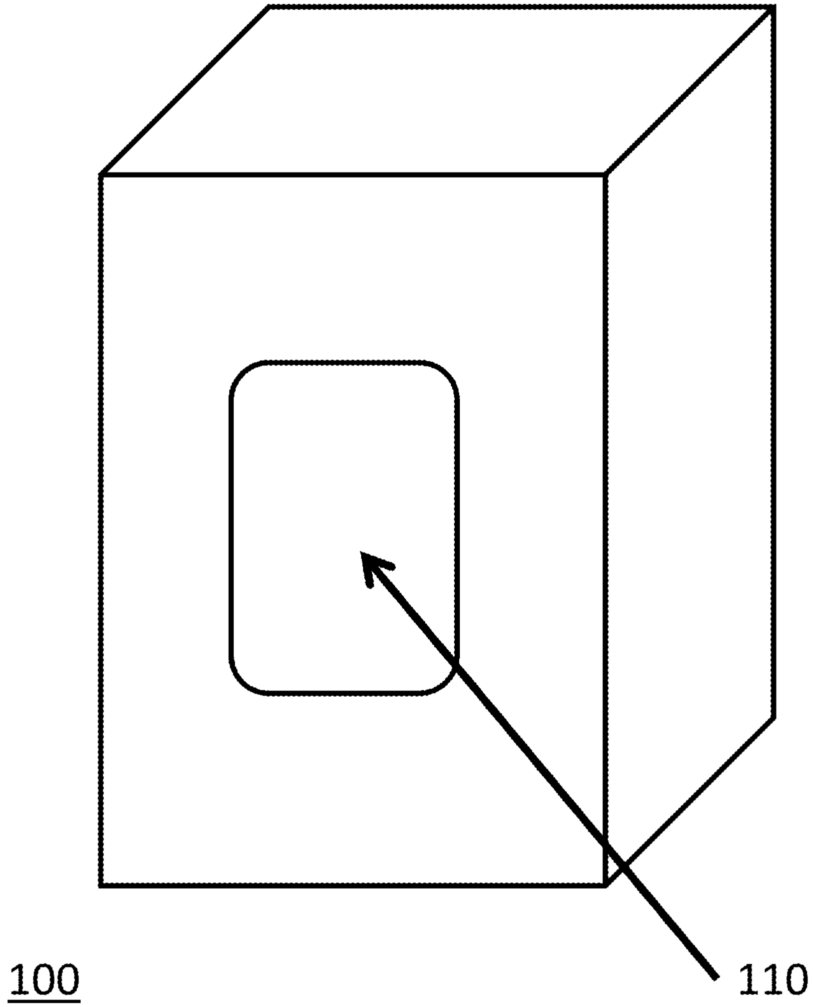
FIG. 1 illustrates a conventional device 100 which includes an object 110 having a surface which should desirably remain free of condensation and frost.

Referring now to the drawings, FIGS. 2A-10 illustrate some of the exemplary aspects of the present invention.

An exemplary aspect of the present invention is directed to a condensation inhibiting device that can inhibit condensation on a surface by using an actuator such as a piezoelectric actuator or a transparent electrostrictive actuator film on the surface. Under an electric current, the actuator can change shape to help inhibit or remove the condensation (e.g., fog or frost) from the surface. The term "electrostrictive" should be understood to mean having a property of changing shape under an application of an electric field (e.g., constricting by pressure-based electric activation).

The surface can include any surface which is desired to remain fog and frost-free. For example, the surface can include a surface of a transparent member such as a window or door. The surface can also include a surface of a mirror or other non-transparent member.

The condensation inhibiting device can use a thermoelectric generator to power the actuator in order to help reduce energy consumption. Although the energy consumed in a single application may be small, the total energy consumption is significant considering the number of applications which may be involved.

Figure 2A:
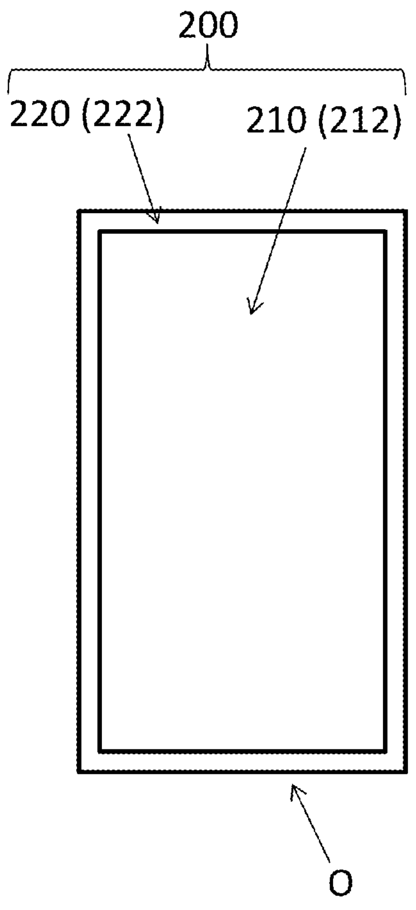
FIG. 2A illustrates a front view of an object O including a condensation inhibiting device 200, according to an exemplary aspect of the present invention.
Figure 2B:
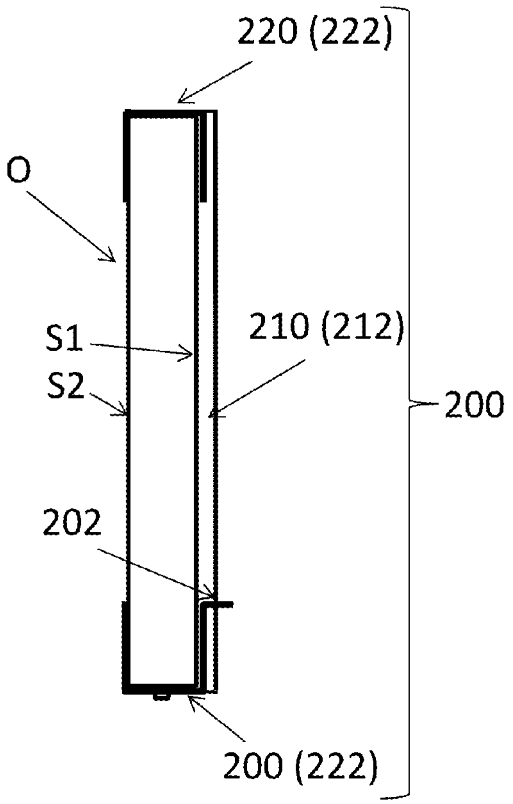
FIG. 2B illustrates a side view of an object O including a condensation inhibiting device 200, according to an exemplary aspect of the present invention.

FIGS. 2A and 2B illustrate an object O (e.g., mirror, window, door) including a condensation inhibiting device 200, according to an exemplary aspect of the present invention.

As illustrated in FIGS. 2A and 2B, the condensation inhibiting device 200 includes a condensation inhibiting unit 210 including a transparent electrostrictive actuator film 212 for inhibiting condensation on a first surface S1 of the object O, and a thermoelectric generator 220 including an electrode 222 which powers the condensation inhibiting unit 210.

In particular, FIG. 2A illustrates a front view of the object O, according to an exemplary aspect of the present invention. As illustrated in FIG. 2A, an electrode 222 (e.g., thermoelectric electrode) can be formed around a periphery of the object O. The electrode 222 can be integrated with a face of the object O, or can be fixed to the object by screws, adhesive etc.

FIG. 2B illustrates a side view of the object O, according to an exemplary aspect of the present invention. As illustrated in FIG. 2B, the electrode 222 can be formed around an edge of the object O and extend from a first surface S1 of the object O to a second surface S2 of the object O. In addition, a sensor wiring connector 202 can be connected to the electrode 222. Although the sensor wiring connector 202 is illustrated in FIG. 2B as being formed on the first surface S1, the sensor wiring connector 202 can be formed on the second surface S2 depending upon the application.

For example, where the object O is a door for a freezer, S1 can be the surface of the door facing the inside of the freezer, and S2 can be the surface of the door facing outside the freezer. In another example, where the object O is an aircraft window, S1 can be the surface of the window facing outside the aircraft, and S2 can be the surface of the window facing inside the aircraft.

Although the transparent electrostrictive actuator film 212 is illustrated in FIGS. 2A and 2B as being formed on all of the first surface S1, the film 212 can be formed on only part of the first surface S1, depending on the application. That is, the film 212 can contact the electrode 222 and be formed on only a portion of the first surface S1. The amount of the first surface S1 on which the film 212 is formed depends on the application. For example, where the object O includes a viewing portion and a non-viewing portion, the film 212 can be formed on the first surface S1 only for the viewing portion, and not formed on the first surface S1 for the non-viewing portion.

Figure 2C:
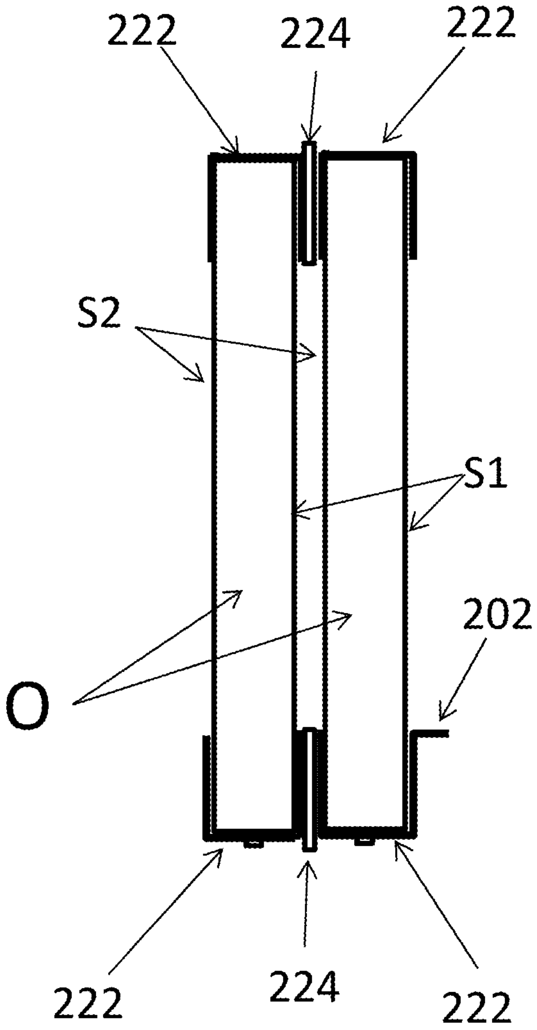
FIG. 2C illustrates a side view of plural objects O including a condensation inhibiting device 200, according to another exemplary aspect of the present invention.

FIG. 2C illustrates a side view of plural objects O (e.g., plural objects which are desired to remain fog and frost-free), according to another exemplary aspect of the present invention.

As illustrated in FIG. 2C, where there are plural objects O (e.g., a dual pane window or door), the electrode 222 can be formed around the periphery of one or more of the plural objects O. For example, an electrode 222 can be formed around the individual objects O, as illustrated in FIG. 2C. In this case, an insulating layer 224 can be formed between the electrodes 222 of adjacent ones of the plural objects O. Alternatively, a single electrode 222 can be formed around the plural objects O.

Figure 2D:
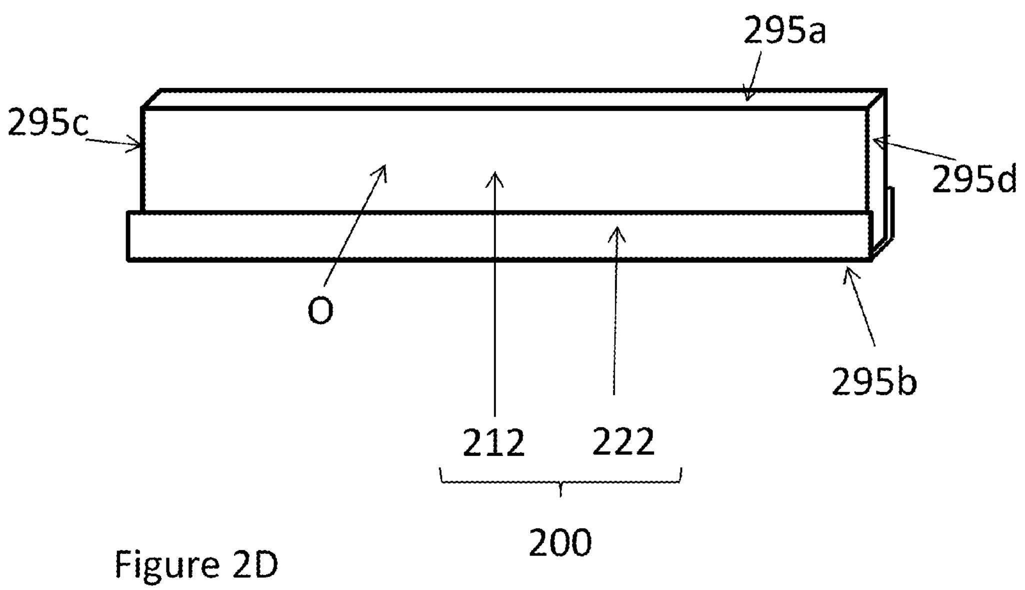
FIG. 2D illustrates a side view of plural objects O including a condensation inhibiting device 200, according to another exemplary aspect of the present invention.

FIG. 2D illustrates an object O, according to another exemplary aspect of the present invention.

As illustrated in FIG. 2D, the electrode 222 is not required to be formed around an entire periphery of the object O, but can be formed on only a portion of the periphery of the object O. For example, where the object O has a top edge portion *295a*, bottom edge portion *295b* and side edge portions *295c*, *295d*, the electrode 222 can be formed only around the bottom edge portion *295b*. This configuration can be used, for example, where a length of the top and bottom edge portions *295a*, *295b* is much greater than a length of the side edge portions *295c*, *295d*, so that the electrode 222 formed only on the bottom edge portion *295b* is sufficient to inhibit condensation on the object O (e.g., keep the object O fog and frost free).

Figure 3:
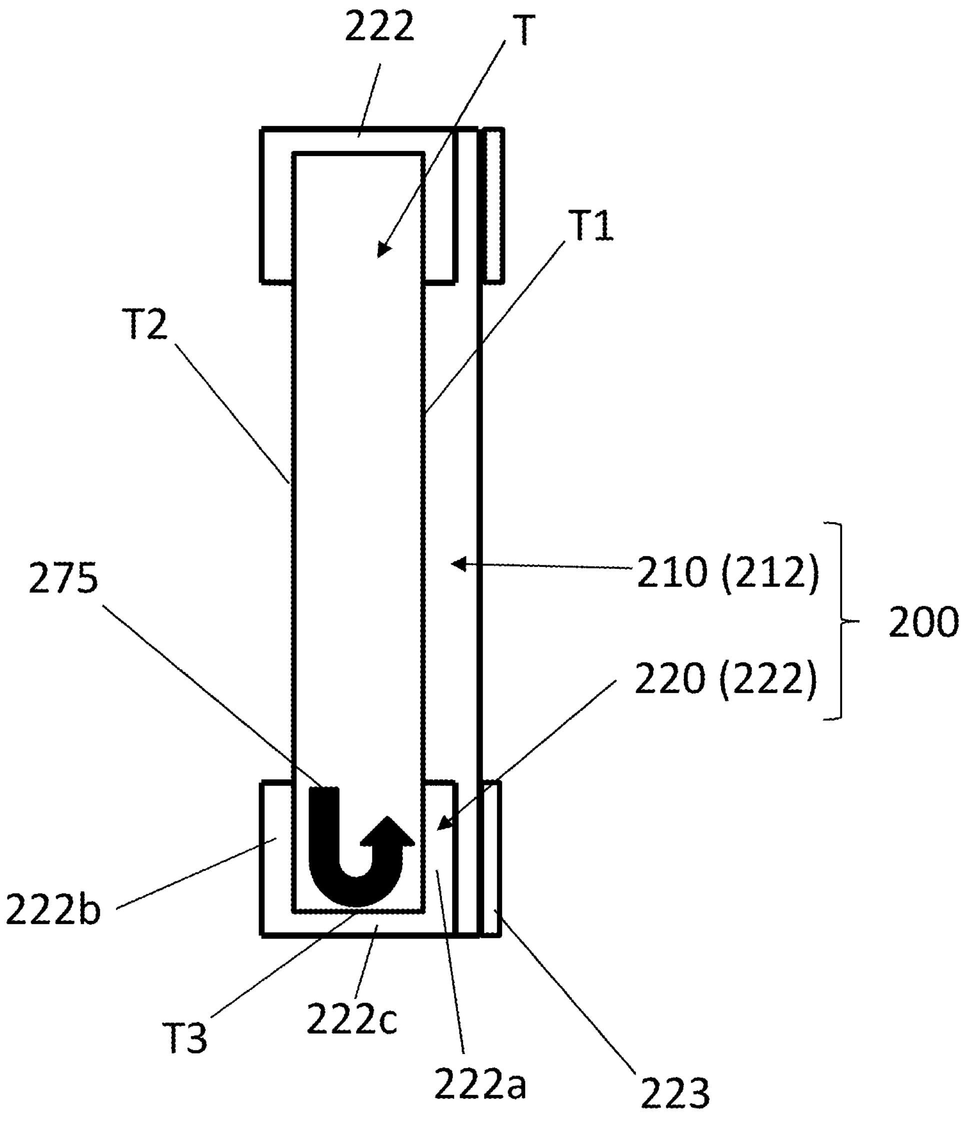
FIG. 3 illustrates a condensation inhibiting device 200 according to an exemplary aspect of the present invention.

FIG. 3 illustrates a condensation inhibiting device 200 according to an exemplary aspect of the present invention.

As illustrated in FIG. 3, the condensation inhibiting device 200 includes a condensation inhibiting unit 210 for inhibiting condensation on a first surface T1 of a transparent member T, and a thermoelectric generator 220 which powers the condensation inhibiting unit 210.

This exemplary aspect of the present invention can be used, for example, in any device (e.g., aircraft, automobiles, watercraft, submarines, industrial equipment, farm equipment, refrigerators, freezers, consumer devices, eyeglasses, protective goggles or building structures), where a local thermal gradient (e.g., thermal energy difference) can be used to generate power, and can be particularly useful where the device includes a transparent member such as a window or door, and particularly where external power is not available.

For example, it is important for a door of a freezer in a grocery store to remain transparent so that consumers can view the contents of the freezer. However, when the door is opened, moisture in the air outside of the freezer may condense on the cold inner surface of the door (or between inner facing surfaces of the door) reducing the transparency of the door. In this case, the thermoelectric generator 220 exploits the thermal gradient between the inside of the freezer and the outside of the freezer, in order to power the condensation inhibiting unit 210.

That is, an aspect of the present invention can provide in-situ power generation for a transparent member (e.g., a super-hydrophobic (SH) frost free freezer door) which should remain transparent to an end-user (e.g., a consumer).

The power generated by the thermoelectric generator 220 can also enable other power-saving measures by providing power, for example, to a visual sensor or dielectric sensor that determines the presence of ice and then trips an alert for maintenance, or can serve as a reference sensor for a closed-loop actuation of the condensation inhibiting unit. When the power saved or generated from the thermoelectric generator using the thermal gradient are calculated over thousands of freezer doors over years of operation, even milliwatts per day per door or window can add up to significant energy savings.

Referring again to FIG. 3, as illustrated therein, the thermoelectric generator 220 can include an electrode 222 including a first portion 222*a* formed on the first surface T1 and a second portion 222*b* formed on a second surface T2 of the transparent member T. The electrode 222 can also include a third portion 222*c* formed on a third surface T3 of the transparent member T which connects the first and second surfaces T1, T2. Further, the condensation inhibiting unit 210 can include a transparent electrostrictive actuator film 212 (e.g., polymer film) which is connected to the electrostriction electrode 222 and formed (e.g., coated) on the first surface T1.

The electrostrictive effect of the film 212 is feasible over a greater area than a piezoelectric actuator, and will not impede door or window operation, because the transparent electrostrictive actuator film 212 can require less wiring than a piezoelectric actuator.

Another electrode 223 can be formed on transparent electrostrictive actuator film 212 so that the transparent electrostrictive actuator film 212 is sandwiched between the first portion 222*a* and the other electrode 223. The other electrode 223 can have a shape similar to the first portion 222*a* and can be formed of the same (or different) material as the first portion 222*a*. The electrode 223 can be connected, for example, to a ground potential. For simplicity, electrode 223 may not be illustrated in other drawings. Candidates for the electrode materials for the electrodes 222, 223 include thin metal layers such as, for example, a very thin (<0.5 microns) gold (Au) layer.

The transparent member T can include, for example, a window or a door, and the condensation inhibiting unit 210 can repel water from the first surface T1 (e.g., inhibit condensation on the first surface T1) to maintain optical transparency of the transparent member T.

For example, the thermoelectric generator 220 can operate where the first portion 222*a* of the electrode 222 is at a first temperature and the second portion 222*b* of the electrode 222 is at a second temperature different from the first temperature. In this case, the temperature gradient between the first and second portions 222*a*, 222*b* of the electrode 222 can cause the thermoelectric generator 220 to generate an electric current 275 which flows in the direction of the arrow in the electrode 222.

Where the temperature difference between the first and second temperatures is at least about 70° F., the power generated by the thermoelectric generator 220 can be sufficient to drive the condensation inhibiting unit 210 without the need for another power source (e.g., an external power source). However, it is possible for the thermoelectric generator 220 to be used in addition to another power source (e.g., as a supplement to an external power source), where the temperature difference is less than about 70° F.

The Thermoelectric Generator

The electrode 222 used for the electrostriction can include, for example, a thermoelectric material which exhibits a thermoelectric effect which is great enough to power the condensation inhibiting unit 210. As used herein, the term "thermoelectric effect" refers to a phenomena (e.g., Seebeck effect) by which a temperature difference creates an electric potential. The electrode 222 can be formed of one or more layers, and can include one or more materials.

The material of the electrode 222 can have a thermoelectric figure of merit ZT value of 1.0 or greater. For a temperature gradient of about 25° C. or greater, the power output by the electrode 222 can be at least about 50 W.

Some thermoelectric materials that can be used in the electrode 222 can include one or more of, for example, bismuth chalcogenides and their nanostructures (e.g., $Bi_2Te_3$, $Bi_2Se_3$), $Sb_2Te_3$, Magnesium Group IV compounds (e.g., $Mg_2Si$, $Mg_2Ge$, $Mg_2Sn$)), silicides, gold, homologous oxide compounds, silicon-germanium alloys, sodium cobaltate, superlattice materials (e.g., $Bi_2Te_3/Sb_2Te_3$ superlattice material), nanomaterials (e.g., nanocrystalline transition metal silicides,) and tin selenide (SnSe).

In one particular embodiment, the electrode 222 can include, for example, a bismuth telluride module (BTM) which is a plate (e.g., about 2 mm to about 6 mm thick) of doped semiconductor material including an alloy of bismuth and telluride. Like conventional bimetallic thermocouples, a BTM exhibits electrical properties when a thermal gradient is applied transversely through the material. A single semiconductor pellet of BTM can produce approximately four times the output of a single K type thermocouple junction.

Figure 4:
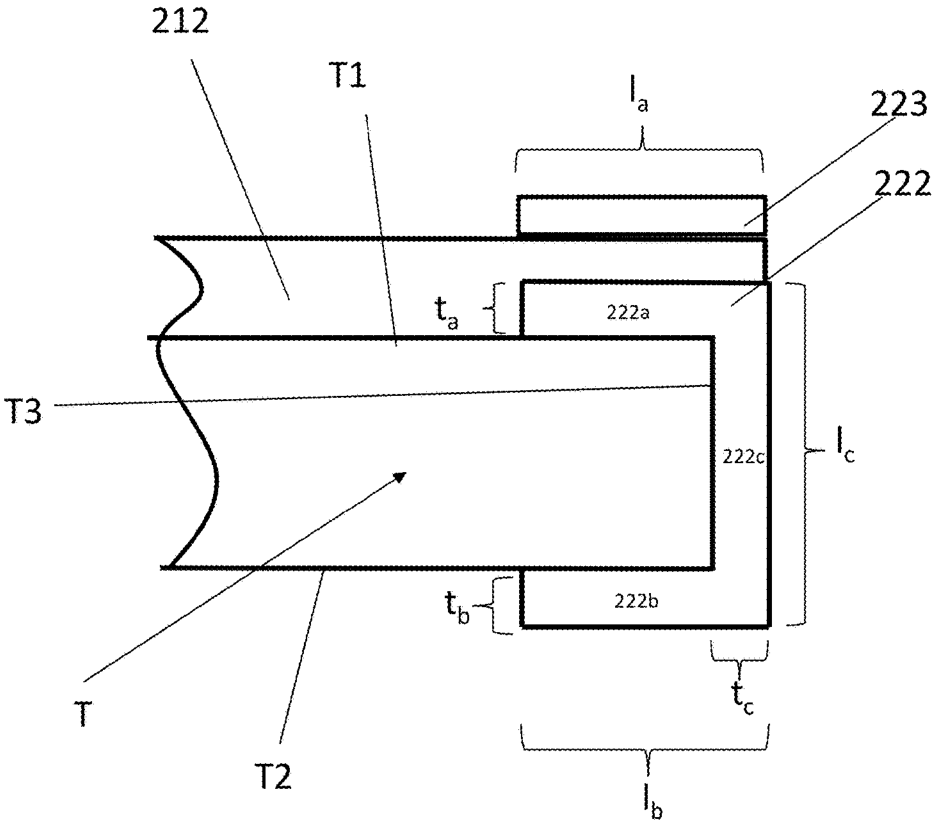
FIG. 4 illustrates the first, second and third sides 222*a*, 222*b* and 222*c* of the electrode 222, according to another exemplary aspect of the present invention.

FIG. 4 illustrates the first, second and third portions 222*a*, 222*b* and 222*c* of the electrode 222, according to another exemplary aspect of the present invention.

As illustrated in FIG. 4, the electrode 222 can be formed on a surface of the transparent member T. Although in FIG. 4, the electrode 222 is illustrated as physically contacting the surface of the transparent member T, the electrode 222 can be disposed spaced apart from the surface of the transparent member T.

The electrode 222 can wrap around the transparent member T, so that the electrode 222 includes the first portion 222*a* formed on the surface T1, the second portion 222*b* formed on the surface T2 and a middle portion 222*c* formed on the third surface T3.

The thickness of the electrode 222 can be in a range from about 0.5 mm to about 1 mm, depending upon the application. The thickness of the electrode 222 can be uniform or can vary depending upon the application. For example, the thickness ($t_a$) of the first portion 222*a* can be greater than or less than the thickness ($t_b$) of the second portion 222*b*. In fact, a configuration where the thickness ($t_a$) of the first portion 222*a* is less than the thickness ($t_b$) of the second portion 222*b* can be used to maximize the electric current generated in the electrode 222 (e.g., the greater the mass of the electrode 222, the greater the electric current generated), while maximizing the strain produced by the film 212 (e.g., the lower the thickness of the film 212, the more strain generated by the electric current in the electrode 222).

The length ($l_c$) of middle portion 222*c* and the thickness ($t_c$) of the middle portion 222*c* can be the same as the lengths ($l_a$) and ($l_b$), and the thicknesses ($t_a$) and ($t_b$), respectively, but should be selected so as to maximize the amount of current generated by the electrode 222 (e.g., in a range from about 0.5 mm to about 1.0 mm).

The length ($l_a$) of the first portion 222*a* and the length ($l_b$) of the second portion 222*b* can be in a range from about 0.5 mm to about 1 mm. Further, the lengths ($l_a$) and ($l_b$) can be the same, or can be different depending upon the application. For example, the length ($l_a$) of the first portion 222*a* can be greater than or less than the length ($l_b$) of the second portion 222*b*.

In addition, the surface of the first portion 222*a* can be treated (e.g., chemically or mechanically etched) in order to increase a surface area of the surface and, thereby increase an amount of contact at an interface between the first portion 222*a* and the transparent electrostrictive actuator film 212.

This can improve adhesion between the surface of the first portion 222*a* and the transparent electrostrictive actuator film 212.

As illustrated in FIG. 4, the transparent electrostrictive actuator film 212 can be formed on the first portion 222*a* of the electrode 222, so that the first portion 222*a* is formed between the transparent member T and the transparent electrostrictive actuator film 212. The transparent electrostrictive actuator film 212 can physically contact an entire length of the first portion 222*a*, or contact only a portion of the first portion 222*a*. However, the amount of contact (e.g., the area of interface) between the first portion 222*a* and the transparent electrostrictive actuator film 212 should be sufficient to actuate the transparent electrostrictive actuator film 212 (e.g., sufficient to cause the transparent electrostrictive actuator film 212 to constrict) so as to inhibit condensation on the surface T1.

Although the electrode 222 is illustrated in FIG. 4 as being wrapped around an edge portion (e.g., third surface T3) of the transparent member T, other arrangements are possible.

FIGS. 5A-5F illustrate other arrangements of the electrode 222, according to an exemplary aspect of the present invention.

Figure 5A:
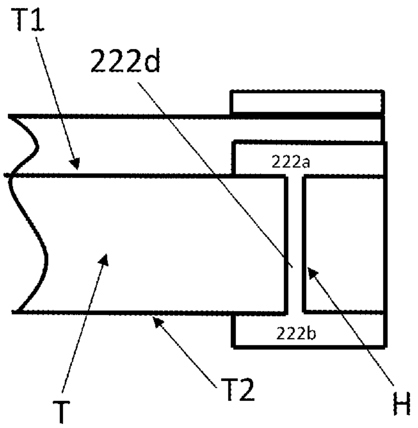
FIG. 5A illustrates another arrangement of the electrode 222, according to an exemplary aspect of the present invention.

As illustrated in FIG. 5A, portions 222*a*, 222*b* of the electrode 222 can be formed on the surfaces T1, T2, respectively of the transparent member T, and include a connecting portion 222*d* which is formed within the transparent member T. For example, the transparent member T can include one or more holes H formed between the first and second surfaces T1, T2, and the connecting portion 222*d* can include column-shaped connecting portions 222*d* formed in the one or more holes H.

Figure 5B:
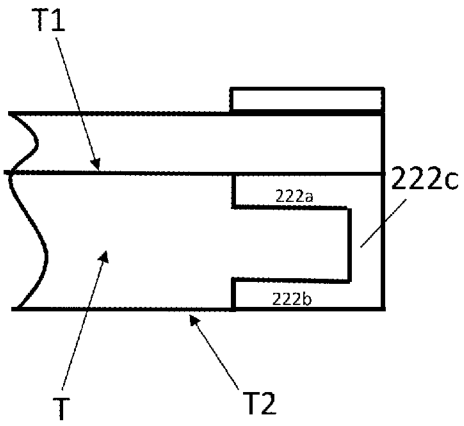
FIG. 5B illustrates another arrangement of the electrode 222, according to an exemplary aspect of the present invention.

As illustrated in FIG. 5B, the transparent member T can have a shape (e.g., machined to have a shape) which allows a surface of the first and second portions 222*a*, 222*b* to be formed flush with the surfaces T1, T2, respectively. This can allow a length of the portion 222*c* to be reduced (over the length of portion 222*c* in FIG. 5A), which can improve the efficiency of the electrode 222.

Figure 5C:
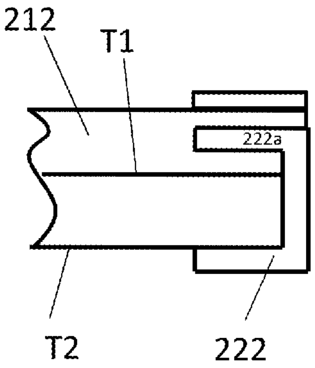
FIG. 5C illustrates another arrangement of the electrode 222, according to an exemplary aspect of the present invention.

As illustrated in FIG. 5C, the first portion 222*a* of the electrode 222 can be formed within the transparent electrostrictive actuator film 212, which can allow for an increased amount of contact (e.g., greater area of interface) between the first portion 222*a* and the transparent electrostrictive actuator film 212.

Figure 5D:
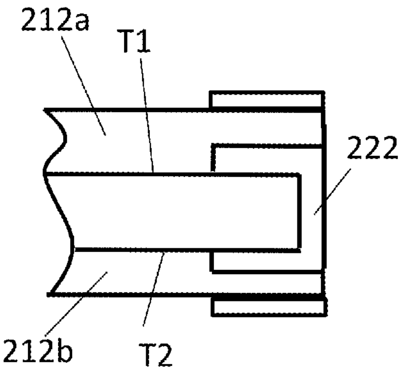
FIG. 5D illustrates another arrangement of the electrode 222, according to an exemplary aspect of the present invention.

As illustrated in FIG. 5D, there can be two transparent electrostrictive actuator films 212*a*, 212*b* which are formed on the surfaces T1, T2, and the first and second portions 222*a*, 222*b* of the electrode, respectively.

Figure 5E:
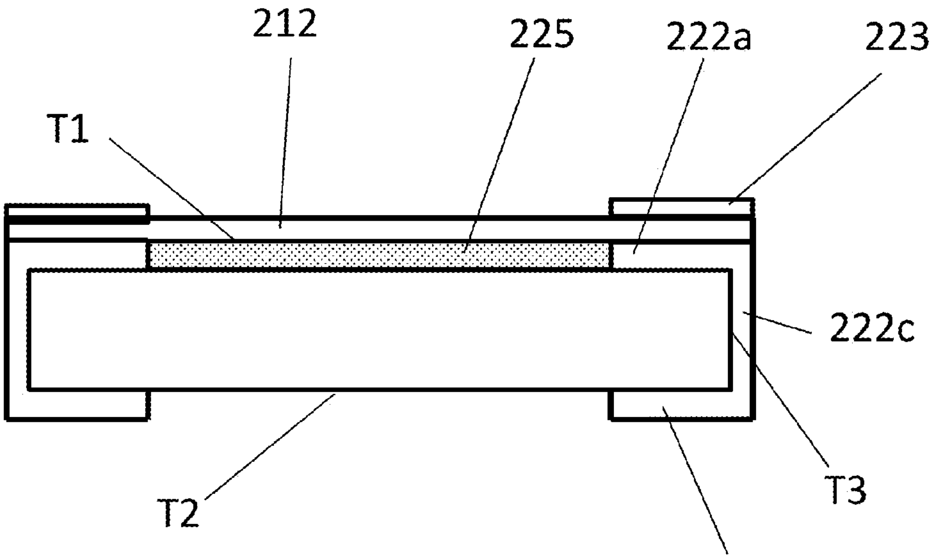
FIG. 5E illustrates another arrangement of the electrode 222, according to an exemplary aspect of the present invention.

As illustrated in FIG. 5E, a transparent electrode 225 can be formed under the film 212 and connected to the electrode 222, in order to supply power to the film 212. Such a transparent electrode can include, for example, a layer of indium tin oxide (ITO), a layer of large area graphene (LAG) that is transparent within the optical wavelength spectra, or a plurality of layers of ITO or LAG, or some combination of layers of ITO, LAG and other transparent conductive materials.

In particular, the transparent electrode 225 can include a layer of LAG having a thickness in a range from about 0.3 nm to about 1.0 nm. The layer of LAG can be formed on the surface T1 of the transparent member T (e.g., over an entirety of the surface T1) and connected to the electrode 222 around the periphery of the transparent member T.

The transparent electrode 225 can improve transmission of power from the electrode 222 to the film (e.g., especially to a central portion of the film 212), over the configurations illustrated in FIGS. 5A-5D. For example, the transparent electrode 225 (e.g., a transparent conductive material such as ITO or LAG), can be formed on over substantially an entirety of the first surface T1, including a viewing portion (e.g., a central portion) of the transparent member T. The transparent electrode 225 (e.g., sheet of LAG) can be formed on the first surface T1 and connected to an end of the first portion 222*a* of the electrode 222, as illustrated in FIG. 5E.

Figure 5F:
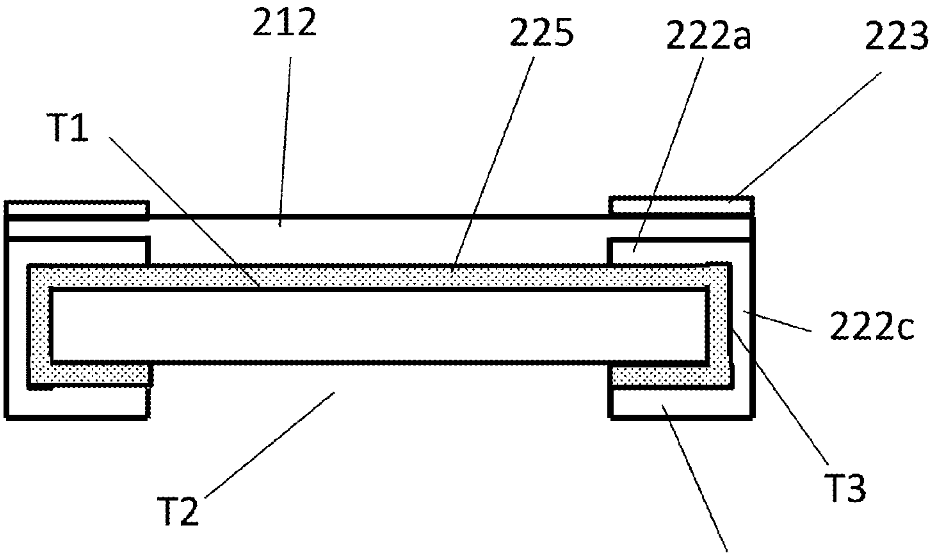
FIG. 5F illustrates another arrangement of the electrode 222, according to an exemplary aspect of the present invention.

As illustrated in FIG. 5F, the transparent electrode 225 can be wrapped around the transparent member T and formed on a peripheral portion of the second surface T2 which is around the periphery of the transparent member T. In this arrangement, the first, second and third portions 222*a*, 222*b* and 222*c* of the electrode 222 can be formed on the transparent electrode 225 and contact the transparent electrode 225 around the periphery of the transparent member T.

Figure 6:
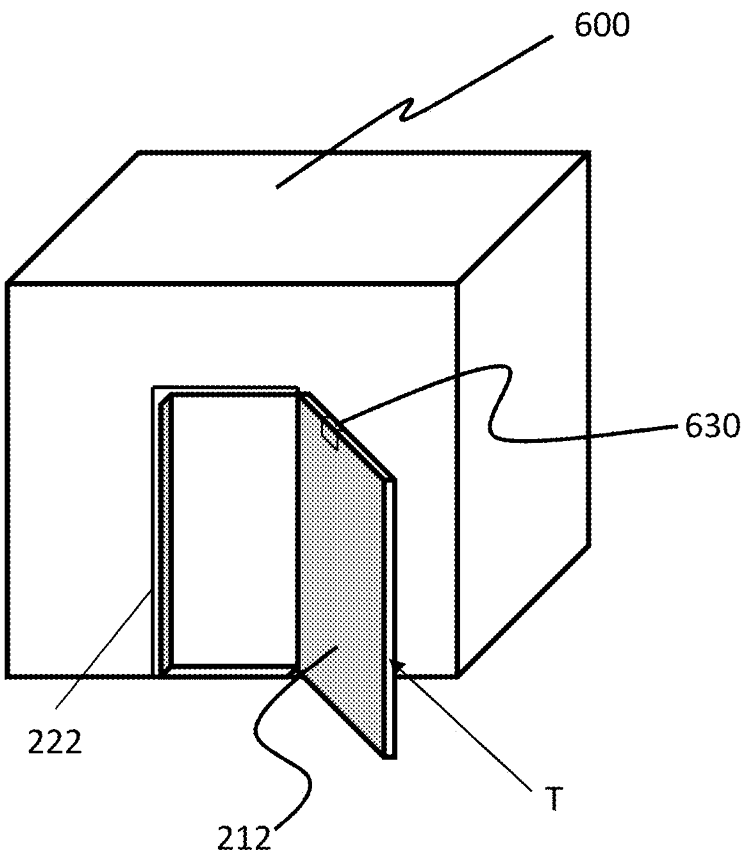
FIG. 6 illustrates an electrode 222 according to another exemplary aspect of the present invention.

FIG. 6 illustrates an electrode 222 according to another aspect of the present invention.

As illustrated in FIG. 6, the electrode 222 is not necessarily formed on the transparent member T (e.g., not formed around the door), but can be located elsewhere in the device (e.g., structure) to which the transparent member T is connected. That is, the electrode 222 can be formed in any location and with any configuration that allows the electrode 222 to realize a temperature gradient between the first portion 222*a* and the second portion 222*b* and allow efficient transmission of power from the electrode 222 to the film 212.

In particular, FIG. 6 illustrates a transparent member T (e.g., door, window) formed in a device 600, and the electrode 222 is formed on the device 600 around a frame supporting transparent member T (e.g., around the door frame or window frame).

As further illustrated in FIG. 6, a metal contact 630 or a plurality of metal contacts 630 can be formed on the transparent member T (e.g., around a periphery of the transparent member T), and the transparent electrostrictive actuator film 212 can be formed on the metal contact 630 (similar to the manner that the film 212 is formed on the electrode 222 in FIG. 3). With this configuration, if the metal contact 630 contacts the electrode 222, then thermoelectric power is supplied from the electrode 222 to the transparent electrostrictive actuator film 212. That is, power is supplied from the electrode 222 to the film 212 via the metal contact 630.

Thus, for example, where the transparent member T includes a door, power can be supplied from the electrode 222 which is formed around a frame of the door, to the film 212 via the metal contact 630 which is formed on the door.

A Sensor

Figure 7:
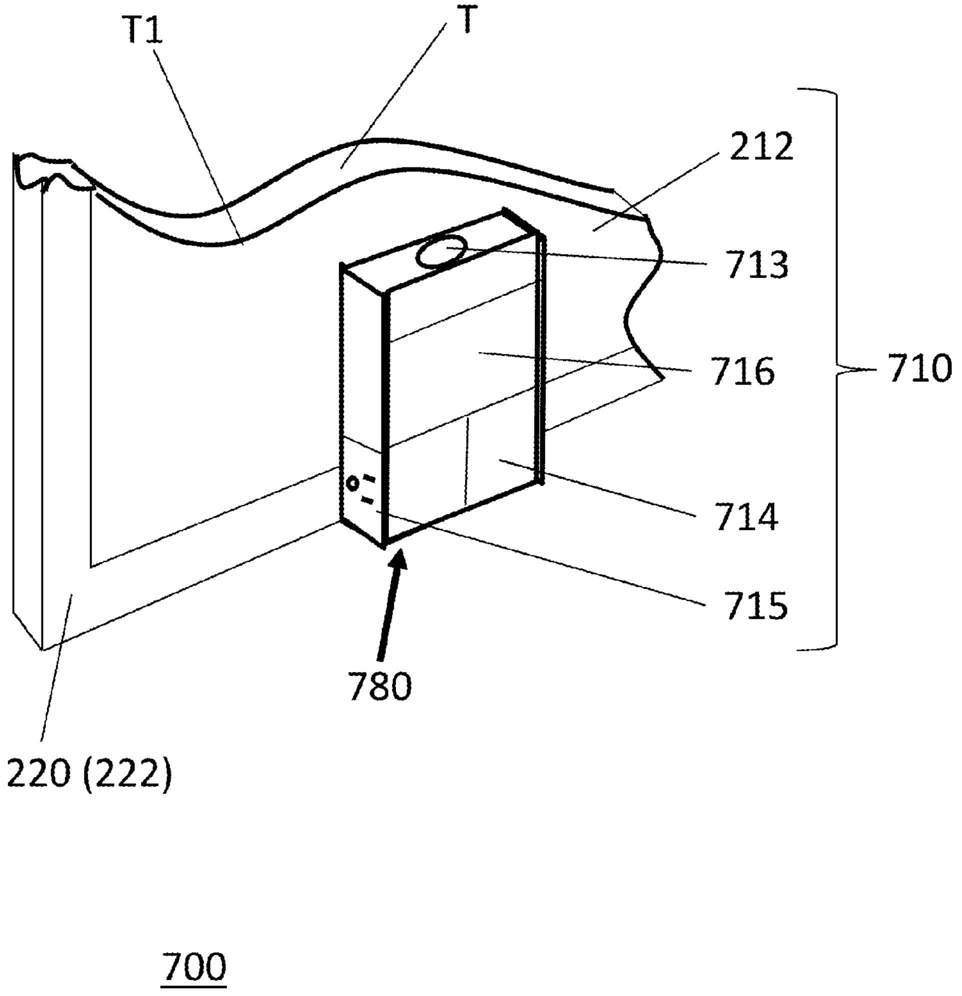
FIG. 7 illustrates a condensation inhibiting device 700 according to an exemplary aspect of the present invention.

FIG. 7 illustrates a condensation inhibiting device 700 according to an exemplary aspect of the present invention.

As illustrated in FIG. 7, the condensation inhibiting device 700 includes a condensation inhibiting unit 710 for inhibiting condensation on a surface (e.g., surface T1), and a thermoelectric generator 220 which includes electrode 222 and powers the condensation inhibiting unit 710. The condensation inhibiting unit 710 includes the transparent electrostrictive actuator film 212, and a sensor 713 which can be powered by the electric current generated by the thermoelectric generator 220. The sensor 713 can detect a presence of water on the surface T1 and generate a corresponding signal. In particular, the sensor 713 can detect the film formation of ice which reduces the transparency of the transparent member T.

The sensor 713 can be fixed to the transparent member T. In particular, the sensor 713 can be fixed to the outer periphery of the transparent member T, and more particularly, can be fixed to the electrode 222 which is formed on the transparent member T (e.g., formed around a periphery of the transparent member T).

Alternatively, the sensor 713 can be fixed to a device (e.g., the device 600 in FIG. 6) to which the transparent member T is connected. For example, where the transparent member T is a door or window of a freezer, the sensor 713 can be fixed to the frame of the door or window of the freezer.

The sensor 713 can include any type of sensing unit or detector which can detect the presence of water (e.g., condensation) on the surface T1. For example, the sensor 713 can include an optical sensor which detects the presence of water by detecting a decrease in transparency of the transparent member T. Alternatively, the formation of ice will change the surface dielectric constant, so the sensor 713 can include a dielectric constant sensor which detects the presence of water (e.g., ice) by detecting a dielectric constant of the surface T1.

The condensation inhibiting unit 710 can further include a control circuit 714 (e.g., microcontroller) that controls an operation of the condensation inhibiting unit 710 based on the detection signal from the sensor 713. If the detection signal indicates that the sensor detects the presence of water on the surface T1, then the control circuit 714 can cause the electric current to activate the transparent electrostrictive actuator film 212 (e.g., increase the electric current to the film 212). If the detection signal indicates that the sensor 713 does not detect the presence of water on the surface T1, then the control circuit 714 can cause the electric current to be redirected away from the condensation inhibiting unit 710 (e.g., decrease the electric current to the film 212).

The condensation inhibiting unit 710 can also include an electrical connector 715 for electrically connecting the condensation inhibiting unit 710 to a power supply (e.g., standard 110 V power supply). In addition to, or in place of the electrical connector 715, the condensation inhibiting unit 710 can include a battery connection so that the condensation inhibiting unit 710 can be powered by a battery (e.g., rechargeable battery).

The condensation inhibiting unit 710 can also include a display unit 716 for displaying information about the operation of the condensation inhibiting unit 710. The display unit 716 can also display other information such as conditions (e.g., temperature, humidity) inside the device to which the transparent member T is connected (e.g., device 600 in FIG. 6) and service alerts.

As illustrated in FIG. 7, the condensation inhibiting device 700 can include a module 780 (e.g., polymer or metal case) for containing various elements of the condensation inhibiting unit 710. For example, the module 780 can include the sensor 713, the control circuit 714, the electrical connector 715 and the display unit 716, and can be mounted on the transparent member T, on a frame around the periphery of the transparent member, or elsewhere in the device to which the transparent member T is connected (e.g., device 600 in FIG. 6).

A Control Circuit

Figure 8:
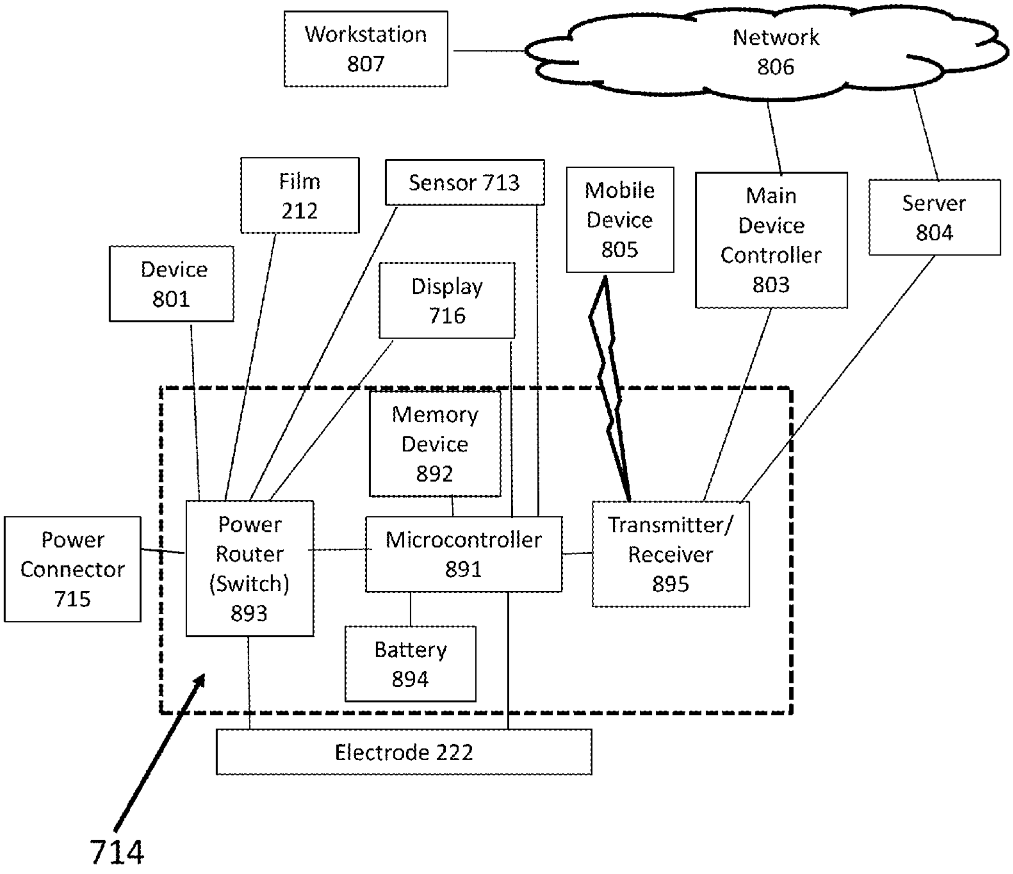
FIG. 8 illustrates the control circuit 714, according to an exemplary aspect of the present invention.

FIG. 8 illustrates the control circuit 714, according to an exemplary aspect of the present invention.

As illustrated in FIG. 8, the control circuit 714 can include a microcontroller 891 connected (e.g., by wire) to the electrode 222, and powered via this connection by the electric current generated by the electrode 222. The control circuit 714 can also include a memory device 892 (e.g., random access memory (RAM)) which is accessible by the microcontroller 891 and stores operating parameters and programming algorithms for operating the condensation inhibiting unit 710.

Thus, the microcontroller 891 can access the memory device 892 to control an operation of the condensation inhibiting unit 710. In particular, the microcontroller 891 can control an operation of the sensor 713 and the display 716.

The control circuit 714 can also include a power router 893 (e.g., switch) which is controlled by the microcontroller 891. The power router 893 can be directly connected to the electrode 222 and controlled by the microcontroller 891 to route power from the electrode 222 to the transparent electrostrictive actuator film 212, and/or to a device 801 such as a light, fan, condenser, etc. in the device to which the transparent member T is connected (e.g., device 600 in FIG. 6). The power router 893 can also route power to the sensor 713 and the display device 716.

The power router 893 can also route power to the power supply connector 715 which can in turn be connected to a power grid via a power supply line. This can enable the condensation inhibiting unit 710 to harvest energy from the thermoelectric generator and/or return energy to the power grid.

The control circuit 714 can also use the power router 893 to provide a "pulse" of electric current to the film 212. In particular, the control circuit 714 can apply short repeated pulses of electric current to the film 212 in order to provide a "vibrating" effect the film 212 which can improve the ability of the film 212 to repel water and frost.

The control circuit 714 can also include a transmitter/receiver 895 for wirelessly (or by wire) communicating with the controller 803 of the main device in which the control circuit 714 is operating, a server 804 (e.g., in-store server), and a mobile device 805 (e.g., mobile telephone). Thus, for example, on a particularly humid day, if a store manager sees that condensation is forming on the doors of the store's freezers, the store manager can use his mobile device 805 to communicate with the microcontroller 891 via the transmitter/receiver 895, in order to adjust the settings on the condensation inhibiting unit 710.

With these features, an operation of the condensation inhibiting unit 710 can be coordinated with operation other features of the device, other features of the store, and in fact, other features of the company. These features can also allow the store manager to conveniently monitor an operation of the condensation inhibiting unit 710. For example, microcontroller 891 can cause data such as operating data (e.g., transparency of the transparent member, energy consumption, etc.) and history data (e.g., operating data over the past 30 days, over the past 6 months, etc.) to be communicated (e.g., periodically communicated) to the server 804 and stored on the server 804.

As further illustrated in FIG. 8, the control circuit 714 can be in communication with a remote workstation 807 (e.g., personal computer) via a network 806 (e.g., the Internet). This can enable data to be shared between the remote workstation 807 and the control circuit 714, and can enable the control circuit 714 to be remotely controlled by the workstation 807, and can also enable the operating parameters and programming algorithms stored in the memory device 892 to be remotely adjusted or set by the workstation 807.

The microcontroller 891 may also be connected to a battery 894 as an alternative power source for powering the film 212, sensor 713, display 716, etc.

A Transparent Electrostrictive Actuator Film

Referring again to FIG. 2, the transparent electrostrictive actuator film 212 can include, for example, an electrostrictive polymer film, a large-area graphene (LAG) film, or some combination of an electrostrictive polymer film and an LAG film. The transparent electrostrictive actuator film 212 can also be formed of one layer (e.g., one material), or a plurality of layers (e.g., a plurality of materials).

The film 212 can be formed, for example, by liquid casting a material of the film 212 onto the transparent member T, and curing the liquid cast material into the film 212.

Alternatively to liquid casting the material of the film 212 onto the transparent member T, the film 212 can be previously formed and then later applied to the transparent member T in a "peel and stick" process. That is, the material of the film 212 can be liquid cast onto a substrate, treated (e.g., cured) and removed from the substrate to form a sheet of the film 212. An adhesive (pressure-sensitive adhesive) can then applied to the sheet of the film 212 (or to the surface of the transparent member T), and the sheet of the film 212 applied to a surface of the transparent member T, with the adhesive side down, so that the adhesive causes the sheet of the film 212 to adhere to the surface of the transparent member T. If necessary, the sheet of the film 212 can be cut to fit the transparent member either prior to or subsequent to the application of the sheet of the film to the surface of the transparent member T.

The transparent electrostrictive actuator film 212 an include, for example, a silicone film made of Dow Corning Sylgard® Silicones (e.g., Sylgard 182® or Sylgard 184®). These silicones are highly viscous fluids which have a viscosity of 3.9 kg/m-s. Sylgards are supplied in two parts, the base and the curing agent.

Forming the transparent electrostrictive actuator film 212 can be performed by mixing the base and curing agent respectively in a 10:1 ratio. After mixing, the silicone is left for 30 minutes to start the curing process, and to allow air bubbles introduced during the mixing to escape. The mixed silicone polymer can then be spread or sprayed onto the surface T1 to form a substantially uniform thin film (e.g., less than 100 μm) on the surface T1. The thin film is then cured for at least 24 hours at a temperature in a range from about 100° C. to about 150° C.

In order to apply a voltage to the transparent electrostrictive actuator film 212, electrodes (e.g., 222 and 223 in FIG. 3)) can be formed on both sides of a silicone film. In order to enable the film 212 to expand freely and contract, the electrodes 222, 223 should not add any stiffness to the film 212. That is, the electrodes 222, 223 should be compliant with the film. To do this, the electrodes 222, 223 can have a thickness which is less than a thickness of the film 212. For example, the thickness of the electrodes 222, 223 an be no greater than about 50% of the thickness of the film 212.

Since the strain produced by the film 212 generally decreases with an increase in thickness, the thickness of the film 212 should be no greater than about 500 μm. Further, since the strain produced generally decreases with an increase in thickness of the electrodes 222, 223 the thickness of each of the electrodes 222, 223 should be no greater than about 10 μm.

However, because the electrode 222 is also producing the electric current to drive the film 212, the electrode 222 should have a sufficient thickness to produce an electric field of sufficient magnitude for creating a minimum amount of strain in the film (e.g., an amount of strain which is sufficient to provide an anti-fog and/or anti-frost movement to the film 212). In one particular embodiment, the electrode 222 can produce an electric field of at least about 50 mV/m and the film 212 can have a strain of at least about 20%.

The transparent electrostrictive actuator film 210 can also include (e.g., in addition to or in place of the silicone film) a silica sol which is superhydrophobic, transparent, adherent, thermally stable, and highly durable against humidity. The silica sol can be formed by using vinyltrimethoxysilane (VTMS) as a hydrophobic reagent in a single step sol-gel process, or fluorinated silane, (1H, 1H, 2H, 2H, perfluorooctyl triethoxysilane-FTEOS) as the hydrophobizing agent. In particular, silica sol can be prepared by incorporating VTMS or FTEOS into a silica film such as a tetraethyl orthosilicate (TEOS) based silica or silicone film, in order to make the silica film superhydrophobic (e.g., static water contact angle≥140°). Needle shaped, or pyramidal shaped hydrophobic fillers, that are transparent and possess high refractive index, such as methylated silica, spinel ($Mg_2AlO_4$), and yttria ($Y_2O_3$), or alumina, $Al_2O_3$, (sapphire as transparent alumina, are added to the surface of the film to provide the superhydrophobic morphology.

The transparent electrostrictive actuator film 212 can also include (e.g., in addition to or in place of the silicone film) an asymmetrically surface-modified graphene film. In particular, hexane and oxygen ($O_2$) plasma treatment can be applied to opposite sides of a graphene film to induce asymmetrical surface properties and hence asymmetrical electrochemical responses, responsible for actuation.

The graphene film can be formed, for example, by direct filtration of an aqueous suspension of reduced graphene oxide colloids. The thickness of the graphene film can be in a range from about 4 to about 5 μm in order to provide a free-standing, mechanically flexible but not stiff graphene film.

The hexane plasma treatment enhances the surface hydrophobicity and provides the effective protection of graphene surface from the accessibility of electrolyte ions, which accordingly weakens the surface electrochemical response (a fluorinated or $CF_3$ plasma treatment can also be used to make the graphene film more hydrophobic). The oxygen plasma treated surface can become very hydrophilic and readily accessible to aqueous media due to the plasma-induced oxygen-containing groups.

The asymmetric surface properties of graphene film can induce the distinction of electrochemical response, which produces the driving force responsible for the actuation behavior.

The film 212 can include a treated surface that can improve a condensation inhibiting property of the film 212. In particular, the treated surface can include a plurality of channels (e.g., vertical grooves) that can extend from a top edge of the film 212 to a bottom edge of the film 212. The channels can assist movement of water on the treated surface by providing a minimum gravitationally energetic path to reject water (e.g., water droplets) downward (e.g. as directed by gravity).

Figure 9:
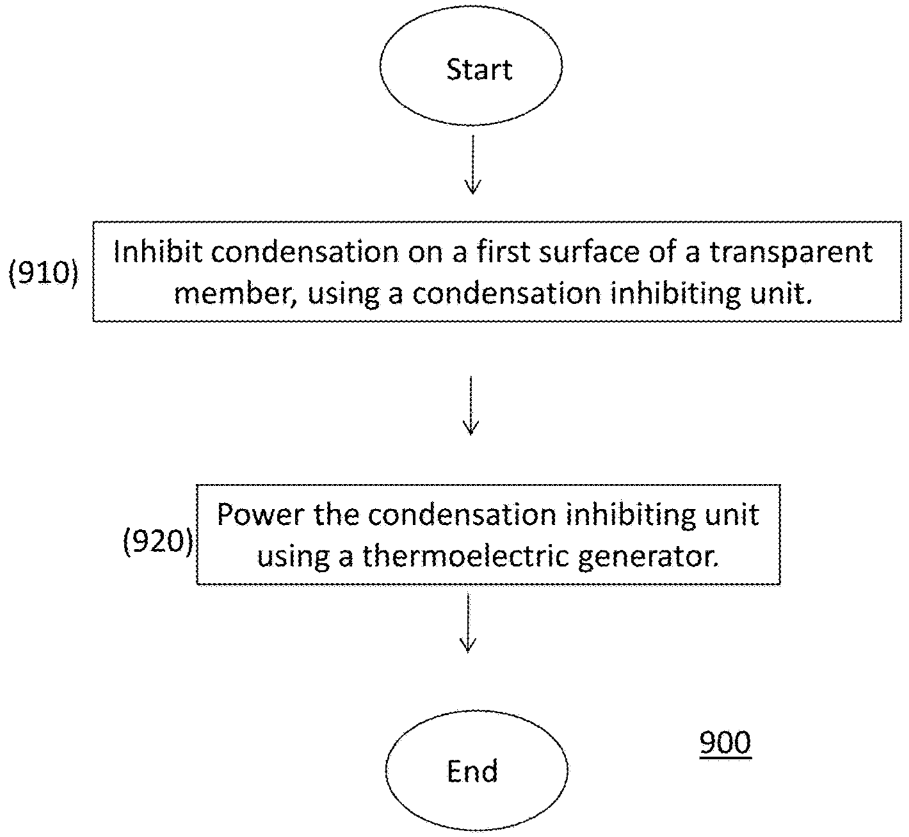
FIG. 9 illustrates a method 900 of inhibiting condensation according to an exemplary aspect of the present invention.

Referring again to the drawings, FIG. 9 illustrates a method 900 of inhibiting condensation according to an exemplary aspect of the present invention.

As illustrated in FIG. 9, the method 900 includes inhibiting (910) condensation on a first surface T1 of a transparent member, using a condensation inhibiting unit, and powering (920) the condensation inhibiting unit using a thermoelectric generator. The condensation inhibiting unit includes a transparent electrostrictive actuator film which is coated on the first surface T1, and the inhibiting of the condensation can include detecting a presence of water on the first surface T1 and generating a corresponding signal, and controlling an operation of the transparent electrostrictive actuator film based on the signal.

The thermoelectric generator can include an electrode which includes a first portion formed on a side of the first surface T1 and a second portion formed on a side of a second surface of the transparent member. A temperature gradient between the first and second portions of the electrode will cause the thermoelectric generator to generate an electric current in the electrode, and the electric current can power the condensation inhibiting unit.

Method of Manufacturing

Figure 10:
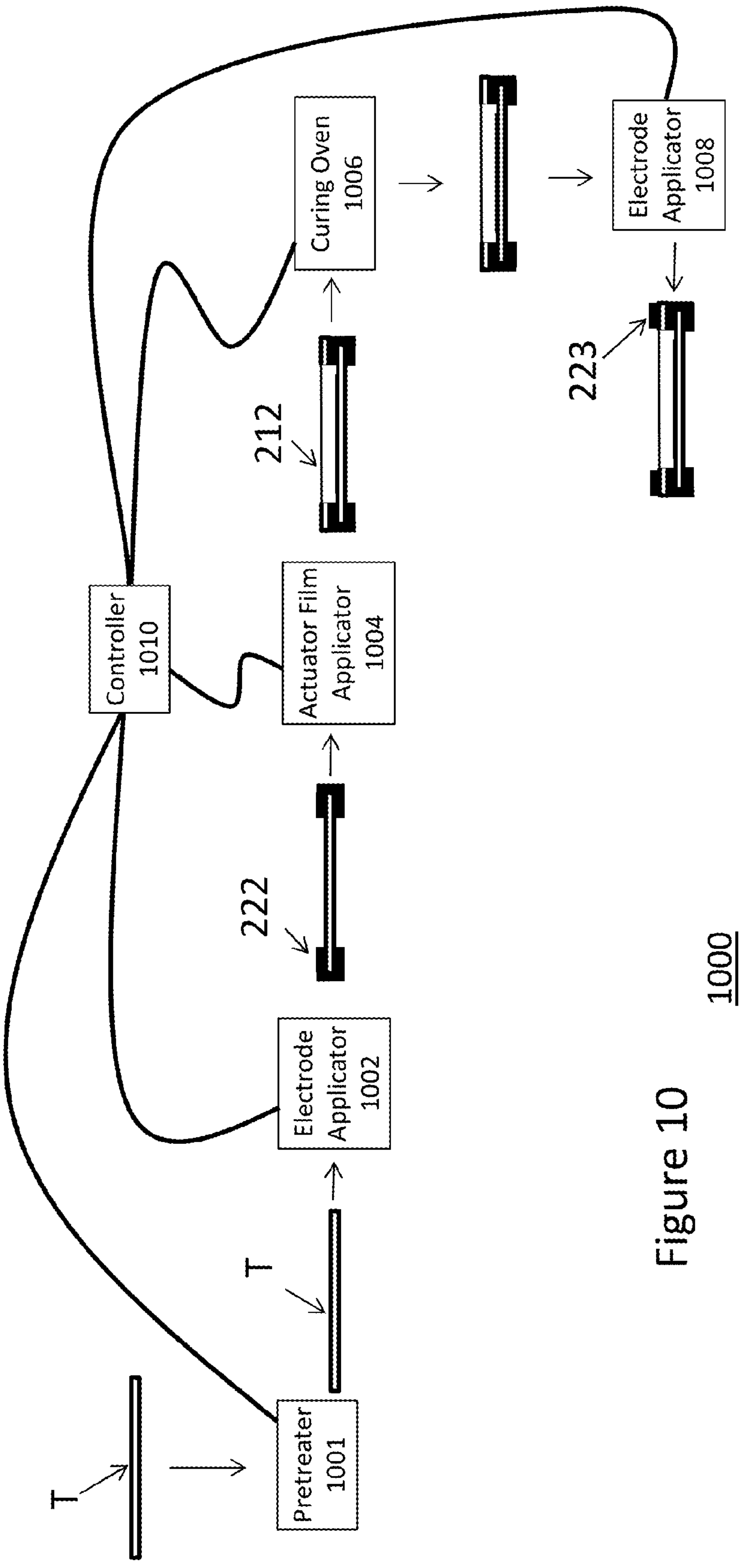
FIG. 10 illustrates a manufacturing system 1000 for manufacturing a condensation inhibiting device according to an exemplary aspect of the present invention.

FIG. 10 illustrates a manufacturing system 1000 for manufacturing a condensation inhibiting device according to an exemplary aspect of the present invention.

As illustrated in FIG. 10, the manufacturing system 1000 includes a pretreater 1001 for pretreating the transparent member T. The pretreater 1001 can, for example, clean the surface T1 to remove dirt, solvent, etc. The pretreater 1001 can also roughen the surface T1 in order to improve the adhesiveness between the electrode 222 and the surface T1, or the adhesiveness between the film 212 and the surface T1.

The manufacturing system 1000 also includes an electrode applicator 1002 for applying electrode 222 to the transparent member T. In one aspect, the electrode applicator 1002 presses a preformed sheet of material (e.g., $Bi_2Te_3$) around the outer periphery of the transparent member T. Alternatively, the electrode applicator 1002 can deposit a material of the electrode 222 on the transparent member T, and then cure the material to form the electrode 222 around the periphery of the transparent member T. The electrode applicator 1002 can also pretreat (e.g., roughen) a surface of the electrode 222 in order to improve an adhesiveness between the electrode and the film 212.

The manufacturing system 1000 also includes an actuator film applicator 1004 for applying the film 212 to the surface T1 and to a surface of the electrode. In one aspect, the actuator film applicator 1004 can liquid cast a material (e.g., silicone) of the film 212. Alternatively, the actuator film applicator 1004 can apply a preformed film 212 onto the surface T1 and onto the electrode 222 (e.g., in a peel-and-stick process), and then remove (e.g., trim) any excess film 212 around the edges of the transparent member T.

The manufacturing system 1000 can also include a curing oven 1006 for curing the liquid cast film 212 (e.g., at a temperature in a range from 100° C. to 150° C.) to have a durable, hydrophobic surface. Alternatively, if a peel-and-stick process is used in the actuator film applicator 1004, then the oven 1006 can be replaced with a press machine to press the film 212 onto the surface T1 and the electrode 222, in order to remove any air bubbles trapped under the film 212 and smooth out the surface of the film 212 to be uniform and flat.

The manufacturing system 1000 can also include an electrode applicator 1008 for applying the electrode 223 onto a surface of the film 212 so that the film 212 is formed between the electrodes 222, 223. In one aspect, the electrode applicator 1008 presses a preformed sheet of material onto the film 212 to form the electrode 223. Alternatively, the electrode applicator 1008 can deposit a material of the electrode 223 on the transparent member T, and then cure the material to form the electrode 223 onto the film 212.

The manufacturing system 1000 can also include a controller 1010 for controlling the various elements of the manufacturing system, including the pretreater 1001, the electrode applicator 1002, the actuator film applicator 1004, the curing oven 1006 and the electrode applicator 1008. The controller 1010 can control the elements of the manufacturing system 1000 based on a particular application of the condensation inhibiting device. For example, the controller 1010 can control the elements of the manufacturing system 1000 to have a first setting where the transparent member T is a freezer door, and to have a second setting (different from the first setting) where the transparent member T is a window for an aircraft.

Exemplary Advantages

Conventional methods of inhibiting condensation (e.g., preventing or removing fog and frost) on windows and doors have been addressed via creative applications of both coatings and actuators. Such conventional methods sense ice formation and use actuators to vibrate or peel the ice off via actuation, which requires external electrical power.

An exemplary aspect of the present invention, on the other hand, uses thermoelectric power generation via an electrode formed at a door or window interface, in a manner that does not interfere with the viewing through the door window. The door and window channel electrode concept can take advantage of the external door surface, and be painted over with a thermally conductive white paint for appearance.

The electrostrictive film 212 does not require any wiring within the field of view, and can potentially cover larger areas. The film 212 can shed ice by changing shape via contraction at a specified or random variation in time, and then returning to the film's original shape. The selection of silicones also compliments the freezer environment, and the glass transition of silicone is as low as about −120° C., so there is no reduction in elastomeric properties, or other properties, such as optical clarity.

The exemplary aspects of the present invention can be especially helpful to freezer manufacturers and window manufacturers operating in cold climates that can use the power scavenging thermoelectric electrode to capture heat loss and generate energy. The exemplary aspects of the present invention can also be helpful in the areas of advanced sensors, batteries and power systems integration.

The door and window concept for a thermoelectric electrode and power scavenging through heat loss when combined with a sensors package and in situ power generation monitoring, can be particularly useful in the areas of green building design and heat loss monitoring and energy generation.

With its unique and novel features, the present invention provides condensation inhibiting embodiments which consume less energy compared to conventional condensation inhibiting devices.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive method and system is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A condensation inhibiting device, comprising:

a condensation inhibiting unit for inhibiting condensation on a first surface of a member; and a thermoelectric generator which powers the condensation inhibiting unit, the thermoelectric generator includes an electrode having a first portion on the first surface of the member and a second portion on a second surface of the member.

2. The condensation inhibiting device of claim 1, wherein the member comprises a transparent member.

3. The condensation inhibiting device of claim 2, wherein the transparent member comprises one of a window and a door, and the condensation inhibiting unit repels water from the first surface to maintain optical transparency of the transparent member.

4. A condensation inhibiting device, comprising:

a condensation inhibiting unit for inhibiting condensation on a first surface of a transparent member;

a thermoelectric generator which powers the condensation inhibiting unit, the thermoelectric generator includes an electrode having a first portion on the first surface of the transparent member and a second portion on a second surface of the transparent member; and wherein the electrode comprises bismuth telluride ($Bi_2Te_3$) and is formed around a periphery of the transparent member.

5. A condensation inhibiting device, comprising:

a condensation inhibiting unit for inhibiting condensation on a first surface of a transparent member;

a thermoelectric generator which powers the condensation inhibiting unit, the thermoelectric generator includes an electrode having a first portion on the first surface of the transparent member and a second portion on a second surface of the transparent member; and wherein the first portion of the electrode is at a first temperature and the second portion of the electrode is at a second temperature, and a difference between the first and second temperatures is at least 50° F.

6. The condensation inhibiting device of claim 1, wherein a temperature gradient between the first and second portions of the electrode causes the thermoelectric generator to generate an electric current in the electrode.

7. The condensation inhibiting device of claim 6, wherein the condensation inhibiting unit comprises a transparent electrostrictive actuator film connected to the electrode and coated on the first surface.

8. The condensation inhibiting device of claim 7, wherein the transparent electrostrictive actuator film includes one of an electrostrictive polymer film and a large-area graphene (LAG) film.

9. The condensation inhibiting device of claim 7, wherein the condensation inhibiting unit further comprises a sensor powered by the electric current, such that the sensor detects a presence of water on the first surface and generates a detection signal.

10. The condensation inhibiting device of claim 9, wherein the sensor comprises one of:

an optical sensor which detects the presence of water by detecting a decrease in transparency of the transparent member, and a dielectric constant sensor which detects the presence of water by detecting a dielectric constant of the first surface.

11. The condensation inhibiting device of claim 9, wherein the condensation inhibiting unit further comprises a controller for controlling an operation of the condensation inhibiting unit based on the detection signal.

12. The condensation inhibiting device of claim 11, wherein if the detection signal indicates that the sensor detects the presence of water on the first surface, then the controller causes the electric current to activate the transparent electrostrictive actuator film.

13. The condensation inhibiting device of claim 12, wherein if the detection signal indicates that the sensor does not detect the presence of water on the first surface, then the controller causes the electric to be redirected away from the condensation inhibiting unit.

14. A device, comprising:

a member having a first surface and a second surface; and a condensation inhibiting device, comprising:

a condensation inhibiting unit for inhibiting condensation on the first surface;

and a thermoelectric generator which powers the condensation inhibiting unit, the thermoelectric generator includes an electrode having a first portion on the first surface of the member and a second portion on the second surface of the member.

15. The device of claim 14, wherein the device comprises one of an aircraft, an automobile, a watercraft, a submarine, a refrigerator, a freezer, a consumer device, eyeglasses, protective goggles and a building structure.

16. The device of claim 14, further comprising:

a main control unit for controlling an operation of the device in coordination with a controller of the condensation inhibiting unit.

17. A method of inhibiting condensation, comprising:

inhibiting condensation on a first surface of a member using a condensation inhibiting unit; and powering the condensation inhibiting unit using a thermoelectric generator that includes an electrode having a first portion on the first surface of the member and a second portion on a second surface of the member.

18. The method of claim 17, wherein the condensation inhibiting unit comprises a transparent electrostrictive actuator film which is coated on the first surface, and wherein the inhibiting condensation comprises:

detecting a presence of water on the first surface and generating a detection signal in response thereto; and controlling an operation of the transparent electrostrictive actuator film based on the detection signal.

19. The method of claim 18, wherein the member comprises a transparent member.

20. The method of claim 17, wherein a temperature gradient between the first and second portions of the electrode cause the thermoelectric generator to generate an electric current in the electrode, and wherein the powering of the condensation inhibiting unit comprises powering the condensation inhibiting unit with the electric current from the electrode.

* * * * *